United States Patent [19]
Pierce

[11] Patent Number: 5,039,305
[45] Date of Patent: Aug. 13, 1991

[54] MULTIPLE RATIO COMPACT TRANSAXLE ASSEMBLY FOR AUTOMOTIVE VEHICLES

[75] Inventor: Stanley L. Pierce, Northville, Mich.

[73] Assignee: Ford Motor Company, Dearborn, Mich.

[21] Appl. No.: 452,455

[22] Filed: Dec. 18, 1989

[51] Int. Cl.⁵ ............................................. F16H 47/08
[52] U.S. Cl. ...................................... 475/71; 475/200; 475/218
[58] Field of Search ...................................... 475/59-63, 475/71, 116, 121, 200, 218, 219, 278

[56] References Cited

U.S. PATENT DOCUMENTS

| | | | |
|---|---|---|---|
| 3,339,431 | 9/1967 | Croswhite et al. | 74/688 |
| 3,411,382 | 11/1968 | Mori | 475/71 X |
| 4,056,988 | 11/1977 | Kubo et al. | 74/695 |
| 4,258,587 | 3/1981 | Morino | 475/200 |
| 4,368,649 | 1/1983 | Vahratian et al. | 475/71 X |
| 4,483,215 | 11/1984 | Ishimaru et al. | 475/59 |
| 4,509,389 | 4/1985 | Vahratian et al. | 74/695 |
| 4,607,541 | 8/1986 | Miura et al. | 74/758 |

FOREIGN PATENT DOCUMENTS

| | | | |
|---|---|---|---|
| 52-11362 | 1/1977 | Japan | 475/218 |
| 55-63041 | 5/1980 | Japan | 475/218 |
| 61-124747 | 6/1986 | Japan | 475/71 |
| 1020266 | 5/1983 | U.S.S.R. | 475/219 |
| 1084452 | 9/1967 | United Kingdom | 475/200 |

OTHER PUBLICATIONS

Ward's Engine Update Magazine, p. 6, Jul. 15, 1989.

Primary Examiner—Dwight Diehl
Attorney, Agent, or Firm—Frank G. McKenzie; Roger L. May

[57] ABSTRACT

A transaxle for an automotive vehicle driveline having an internal combustion engine, a hydrokinetic torque converter (10) mounted on the axis of the crankshaft of the engine, multiple ratio gearing (118, 160) mounted on an output shaft axis (86) located in parallel relationship with respect to the engine crankshaft axis, and a torque transfer drive (14,68,70,78,86) comprising a dual torque flow path between the turbine of the torque converter and the torque input elements of the gearing including clutch and brake structure (96,138,144,106,178,170) for effecting ratio changes in the gearing, the torque converter, the torque transfer gearing and the multiple ratio gearing being packaged in a common assembly with maximum space economy whereby the clutch and brake structure is adapted to select one torque flow path or the other through the transfer drive as well as to control the torque flow pattern through the multiple ratio gearing and whereby the N/V design parameter for the transaxle may be chosen to effect optimum driveline efficiencies for the engine and for the transaxle as well as the optimum gradeability for the vehicle.

12 Claims, 5 Drawing Sheets

|   | 1 | 2 | 3 | R | OD | L/I | G |
|---|---|---|---|---|----|-----|---|
| 1 |   |   | X |   |    | X   | 1 |
| 2 |   | X |   |   |    | X   | 2 |
| 3 | X |   |   |   |    | X   | 2 |
| 4 | X | X |   |   |    |     | 2 |
| 5 | X |   |   |   | X  |     | 2 |
| N |   |   |   |   |    |     | — |
| R |   |   |   | X | X  |     | 1 |

G = Input Ratios 1 & 2

MULTIPLE RATIO COMPACT TRANSAXLE ASSEMBLY FOR AUTOMOTIVE VEHICLES

Technical Field

My invention relates to multiple speed ratio transaxles for use in an automotive vehicle driveline having an internal combustion engine arranged in the powertrain compartment of a vehicle.

BACKGROUND ART

My invention comprises a transaxle assembly having a hydrokinetic torque converter and multiple ratio gearing for use with an internal combustion vehicle engine. In a preferred embodiment, the engine and the transaxle are mounted in a common powertrain package with the axis of the crankshaft of the engine in alignment with the axis of the hydrokinetic torque converter. The multiple ratio planetary gearing is mounted on the output shaft axis, which is arranged in parallel disposition with respect to the converter axis.

The engine and the output shaft axis may be mounted transversely in the forward vehicle engine and transaxle compartment of a front wheel drive vehicle with forward traction wheels. I am aware of prior art teachings of transaxle and engine assemblies of this kind, one example being shown in U.S. Pat. 4,509,389, which shows four-speed planetary gearing arranged concentrically with respect to a power output shaft. The output shaft in turn is connected to the output gear element of planetary gearing through a final drive gear mechanism.

Clutches and brakes for the design of the '389 patent deliver driving torque from a power input sleeve shaft to the planetary gear elements. The turbine of the hydrokinetic torque converter drives a drive sprocket mounted on the axis of the converter. A driven sprocket mounted on the axis of the output shaft is connected through a drive chain to the drive sprocket.

The gear elements of the design of the '389 patent are capable of establishing four forward driving speed ratios and a single reverse speed ratio. Another prior art four-speed ratio transaxle is shown in prior art U.S. Pat. No. 4,607,541.

Various attempts have been made to convert a basic four-speed ratio transaxle of the kind described above into a transmission capable of establishing five forward driving ratios. One example of such an attempt to increase the number of driving ratios is seen in U.S. Pat. No. 4,056,988 where an overdrive gear unit is shown in combination with a dedicated clutch and brake for overdrive operation. The clutch and brake are seen at 3 in FIG. 2 of the '988 patent. In that design, the overdrive gear is used to increase the number of ratios from three to four, but it requires the addition of a separate overdrive gear unit which adds to the complexity of the design and increases cost of manufacture and assembly. It also adds to the space requirements.

An example of an attempt to modify a four-speed in-line transmission to obtain a five-speed ratio transmission is seen in *Ward's Engine Update Magazine*, Page 6, published July 15, 1989. That publication describes an overdrive gear unit mounted at the output shaft end of an in-line transmission within the transmission extension housing. This requires an increase in the overall length of the transmission assembly and adds to the weight and cost.

Another example of a multiple ratio in-line transmission adapted for an overdrive ratio to complement basic three-speed ratio gearing is seen in U.S. Pat. No. 3,339,431. The added gear ratio of the design of the '431 patent is obtained by using an auxiliary planetary unit between the converter and the gearing. Like the previously described overdrive in-line transmission, the transmission of the '431 patent lacks economy of space because of the added axial dimension made necessary by the overdrive gearing.

DISCLOSURE OF INVENTION

My invention comprises a five-speed transaxle assembly having a gear system that has characteristics common to the gearing shown in U.S. Pat. No. 4,509,389. It includes a hydrokinetic torque converter mounted on the axis of an internal combustion engine, the converter axis being spaced from a multiple ratio planetary gear unit mounted on the output shaft axis.

The transaxle assembly provides five ratios with essentially the same space requirements as that of the transaxle of the '389 patent. The fifth ratio, which is the highest speed ratio, can be obtained without adding separate clutches or brakes that are unique to the fifth ratio drive condition. Thus, the clutch and brake system that is used for controlling the main planetary gear unit used to establish four forward driving ratios can be used also to establish a fifth ratio. This is done by including torque transfer gear elements having pitch diameters carefully selected to effect the desired overall ratio spread for the transaxle and by employing a sleeve shaft arrangement that permits the driven gears of the torque transfer gearing to be driveably associated with the torque delivery elements of the four-speed ratio planetary gearing. This fifth speed ratio is achieved without adding axial length to the four-speed ratio gearing assembly.

The torque transfer gearing in the arrangement of my invention is located in a space that corresponds to the space that would be occupied by a drive chain in a transaxle of the kind shown in U.S. Pat. No. 4,509,389. Such a drive chain and the torque transfer gearing of my invention have kinematic similarities.

In my co-pending application, U.S. Ser. No. 412,232, filed Sept. 25, 1989 (Automatic Transaxle Assembly For An Automatic Vehicle Driveline), I have described a transaxle and engine powertrain having at least five forward driving ratios. That transaxle permits precise matching of the speed-torque characteristics of the internal combustion engine with the ratios available in the transaxle gearing to achieve optimum performance and fuel economy while maintaining the desired gradeability for the vehicle. The advantages described in my copending specification relating to the matching of the characteristics of the transaxle to the characteristics of the engine are available also in the design of my present invention, but I have achieved these advantages in my present invention without the necessity for adding a separate friction clutch for controlling the gears of the transfer drive.

The gears of the transfer drive of my present invention are dedicated to the fifth ratio drive condition. In this respect, my present invention is unlike the invention of my co-pending disclosure, which describes an arrangement that has the flexibility for achieving more than five ratios (e.g., up to eight ratios) if that is desired.

A principal feature of my invention resides in the use of clutches and brakes that are common to the clutches and brakes used for controlling four-speed ratio planetary gearing. They therefore are capable of establishing and disestablishing either of two ratios within the torque transfer gearing. Thus, the clutches and brakes for the four-speed planetary gearing can be used during distinct phases of the operating cycle to establish an additional underdrive ratio together with the basic four forward driving ratios during ratio changes from the lowest underdrive ratio to a top ratio, hereinafter identified as the fifth speed ratio.

BEST MODE FOR CARRYING OUT THE INVENTION

The Torque Converter

Figure 1:
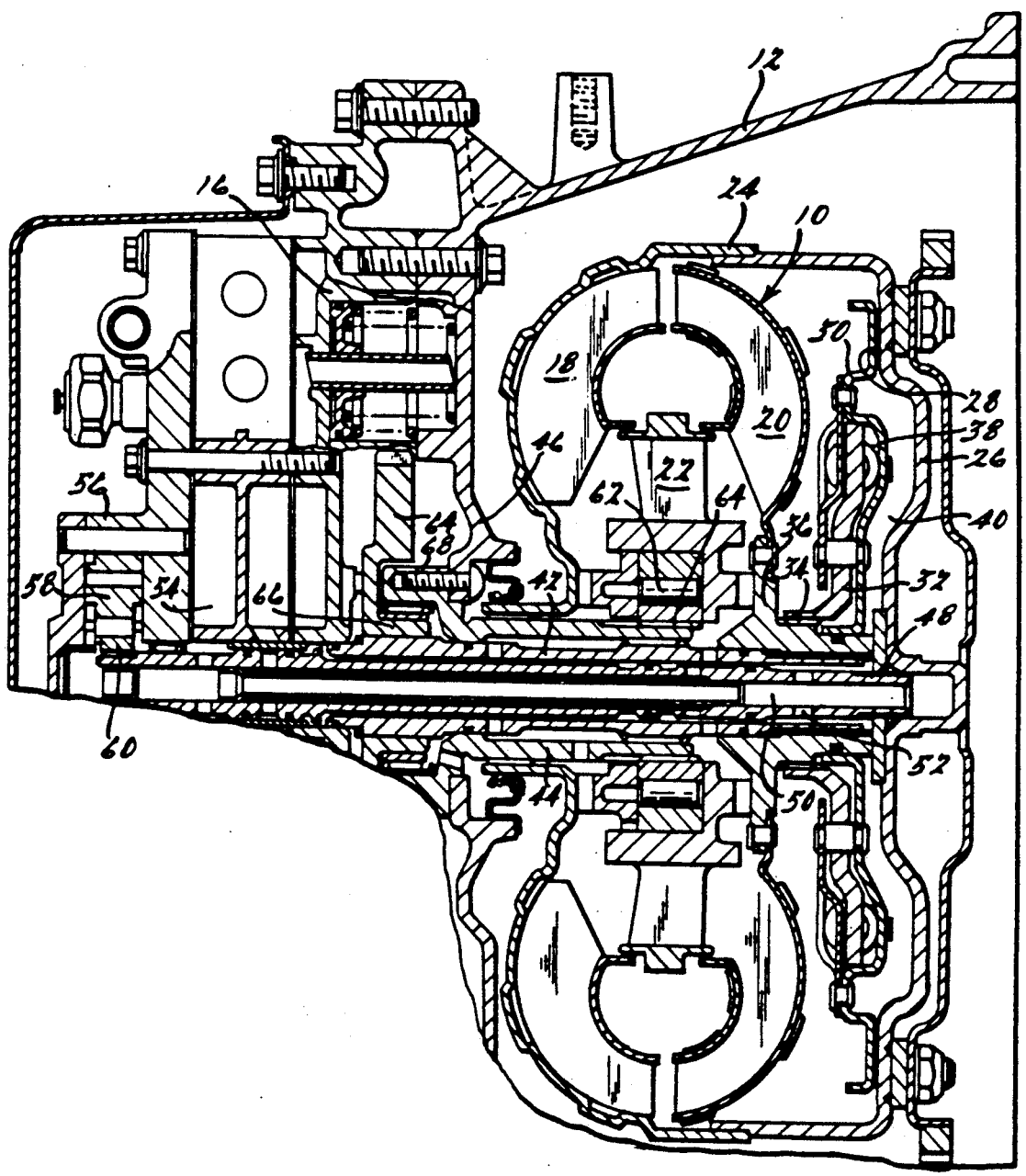
FIG. 1 is a partial cross-sectional view of a hydrokinetic converter assembly for use in the transaxle of my invention.
Figure 3:
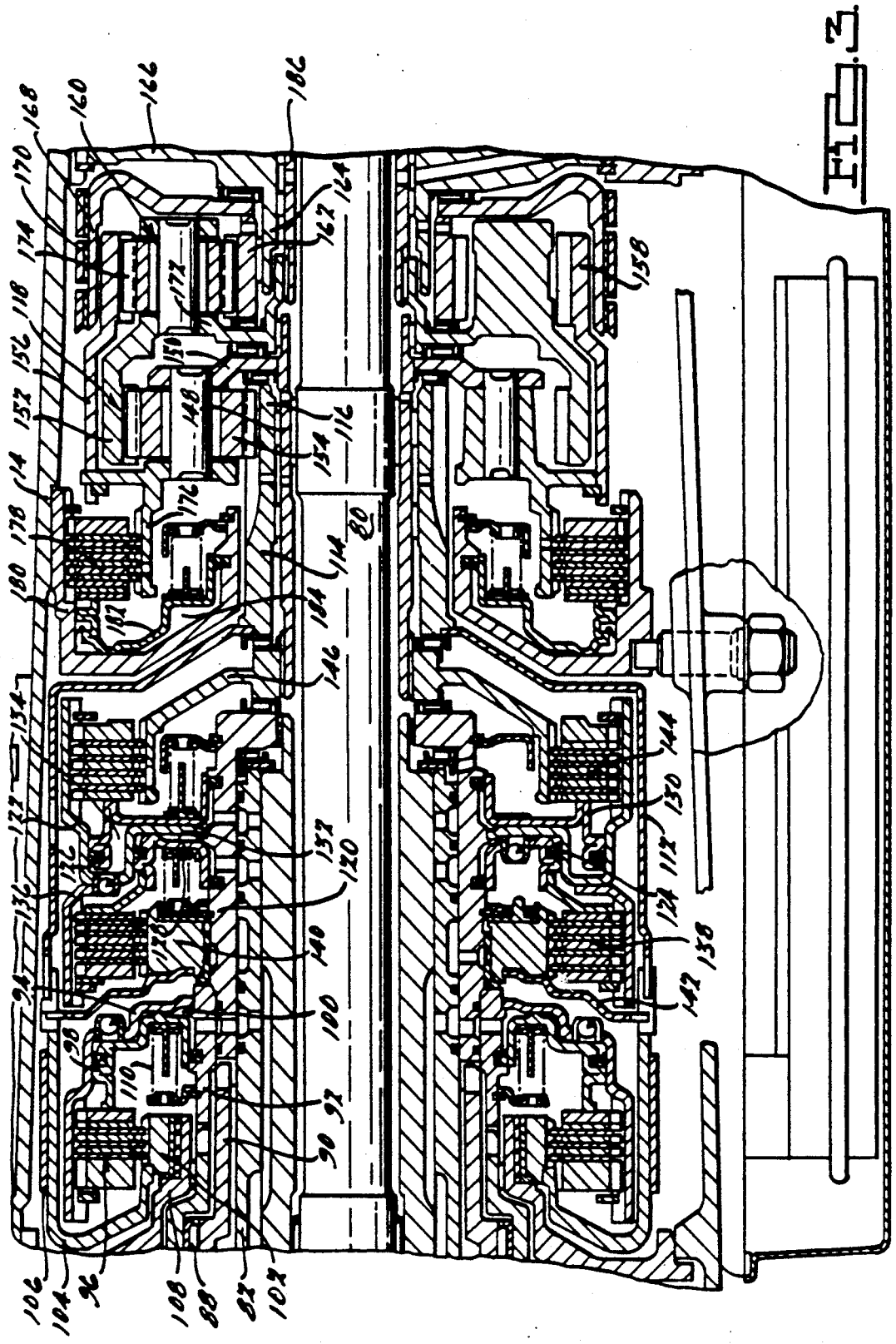
FIG. 3 is a cross-sectional view of the multiple ratio planetary gear elements situated on the output shaft axis of the transaxle of my invention.

In FIG. 1, a hydrokinetic torque converter is generally indicated at 10. It is mounted within a housing portion 12, which forms a part of a common housing assembly together with the transfer gearing and the planetary gearing of FIG. 3. The planetary gear elements, as will be explained with reference to FIG. 3, are located in housing portion 14. The housing portion for the transfer gearing is separately identified by reference character 16.

The torque converter assembly 10 comprises an impeller assembly 18, a turbine assembly 20 and a bladed stator 22, the latter being located between the flow entrance section of the impeller and the flow exit section of the turbine. The impeller comprises radially disposed outflow blades carried by an impeller housing 24. The forward wall 26 of the housing 24 is provided with a radial clutch surface 28 that is adapted to be engaged by lockup clutch plate 30 situated in a space within the converter housing 24 between the wall portion 26 and the turbine 20. The plate 30 is connected to damper plate 32, which is splined at 34 to the hub 36 of turbine 20. Tangentially spaced damper springs 38 are arranged between plate 28 and the damper plate 32 to absorb torsional disturbances in the driveline.

The piston plate 30 cooperates with the wall portion 26 to define a control pressure cavity 40. Fluid pressure is admitted to the cavity 40 to control the capacity of the clutch and to effect controlled engagement of the clutch, thereby establishing a mechanical torque flow path between the impeller and the turbine.

The turbine is splined directly to turbine sleeve shaft 42 which extends through bearing support sleeve shaft 44 secured to support wall 46 of the housing portion 12.

A pump drive shaft 48 is splined to the impeller wall portion 26. It is formed with a central passage 50 which communicates through radial port 52 with the pressure cavity 40. The left-hand end of the passage 50 communicates with control valve body 54 secured to the housing portion 16.

Pump housing 56 is secured to the valve body 54. It encloses positive displacement gear pump elements 58 and 60, the latter being driveably splined to the drive shaft 48.

The stator 22 is mounted on overrunning brake 62, the inner race of which is splined at 64 to the stator sleeve shaft 44.

A torque transfer drive gear 64 is driveably connected to the turbine sleeve shaft 42. It includes a hub 66 journaled on annular support ring 68, which is secured to the support wall 46.

The Torque Transfer Drive

Figure 2:
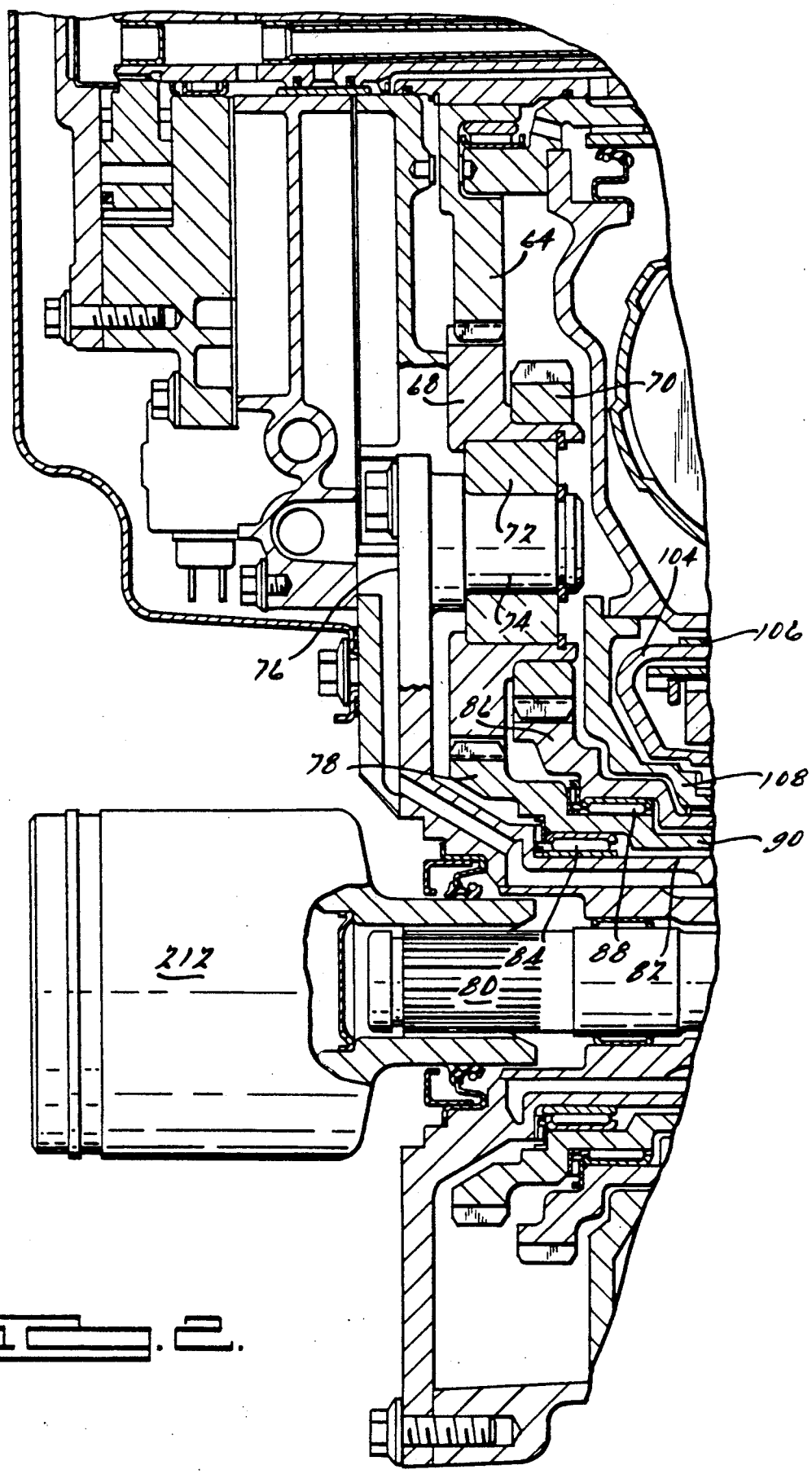
FIG. 2 is a partial cross-sectional view of a torque transfer gear assembly for transferring driving torque between the engine axis and the output shaft axis.

As seen in FIG. 2, gear 64 engages one of a pair of idler gears 68. A companion idler gear 70 is disposed adjacent idler gear 68. The idler gears are journaled by means of a common bearing 72 on bearing stub shaft 74, the latter being secured to bearing support wall 76 of the housing portion 16.

Idler 68, which has a larger pitch diameter than idler 70, driveably engages drive gear 64. It engages also driven gear 78 mounted for rotation about the axis of driven shaft 80. A stationary sleeve shaft 82, which is secured to or is formed integrally with support wall 76, provides a bearing support for the gear 78.

Idler 70 engages driven gear 86, which is mounted by bearing 88 on sleeve shaft 90. Shaft 90 forms a part of driven gear 78.

The Clutches And Brakes

A sleeve shaft 92, which forms a part of driven gear 86, is connected driveably to clutch cylinder 94 for multiple disc clutch assembly 96. A cylinder 94 forms an annular chamber that receives annular piston 98 which cooperates with a cylinder to define a clutch pressure chamber 100. Fluid is distributed to the chamber 100 through passages and porting formed in the multiple sleeve shaft arrangement at 92, 90 and 88.

Externally splined discs are carried by the cylinder 94. These register with internally splined discs carried by clutch member 102, which is connected to brake drum 104. Overdrive brake band 106 surrounds the brake drum 104. Clutch member 102 is journaled on a bearing support 108 which forms a part of the stationary housing portion 14. Piston return springs 110 secured by a snap ring to the sleeve shaft 92 urge the piston 98 to a clutch release position. When chamber 100 is pressurized, clutch 96 is engaged, thereby establishing a driving connection between gear 86 and clutch drum 104.

A torque transfer shell 112 connects the brake drum 104 with sun gear sleeve shaft 114, which is connected to or which forms a part of the sun gear 116 for planetary gear unit 118.

Gear 78 is connected driveably to sleeve shaft 120 which is secured to annular cylinder 122. Cylinder member 122 defines a first annular cylinder 124 and a second annular cylinder 126, the latter being radially spaced from the former. A first annular piston 128 is disposed in the cylinder 124, and a second annular piston 130 is disposed in the annular cylinder 126. Piston 128 and cylinder 124 define a pressure chamber 132 which is supplied with fluid through fluid passages defined by the central sleeve shafts. Likewise, a pressure chamber 134 is defined by the piston 130 and the cylinder 126. It also is supplied with pressure through internal passages in the sleeve shafts.

Cylinder member 122 carries cylinder member 136, which in turn carries externally splined clutch discs for clutch disc assembly 138. These discs cooperate with internally splined clutch discs of the assembly 138 carried by clutch hub 140 secured by clutch member 142 to the brake drum 104. Thus, when the pressure chamber 132 is pressurized, clutch 138 is actuated, thereby establishing a driving connection between shaft 90 and sun gear 116.

Clutch member 122 carries externally splined discs of clutch assembly 144 which register with externally splined discs carried by clutch member 146. Sleeve shaft 148 is splined to the clutch member 146, and it in turn is connected to carrier 150 of gear unit 118.

The Planetary Gearing

When chamber 134 is pressurized, clutch 144 is engaged, thereby establishing a driving connection between clutch member 122 and the carrier 150. Gear unit 118 comprises, in addition to the sun gear 116 and the carrier 150, a ring gear 152. Carrier 150 supports planetary pinions 154 which engage ring gear 152 and sun gear 116. Carrier 150 is connected directly through torque transfer drum 156 to ring gear 158 of planetary gear unit 160. The sun gear 162 of gear unit 160 is supported on sleeve shaft 164 which forms a part of an end support wall 166 located within the right-hand extremity of the housing portion 14. Brake drum 168 is carried by the sun gear 162 and is surrounded by multiple-wrap brake band 170.

Carrier 172 for gear unit 160 is connected to a ring gear 152 of gear unit 156. Planet pinions 174 supported on the carrier 172 engage driveably the ring gear 158 and the sun gear 162. Brake band 170, which when applied anchors the sun gear 162, provides a reaction point during operation in the first, second and third speed ratios.

Carrier 150 is connected to or forms a part of brake member 176 which carries internally splined friction discs of multiple disc brake assembly 178. Externally splined discs of the assembly 178 are secured to brake cylinder member 180, which in turn is secured to the housing portion 14. Member 180 defines an annular cylinder that receives annular piston 182 adapted to engage brake assembly 178 when fluid pressure is admitted to the brake pressure chamber 184 defined by the cylinder 180 and the piston 182.

The multiple disc brake assembly 178, the multiple disc clutch 144, and the multiple disc clutch 138 each have piston return springs similar to the return springs 110 for the clutch assembly 96.

The Final Drive

Figure 4:
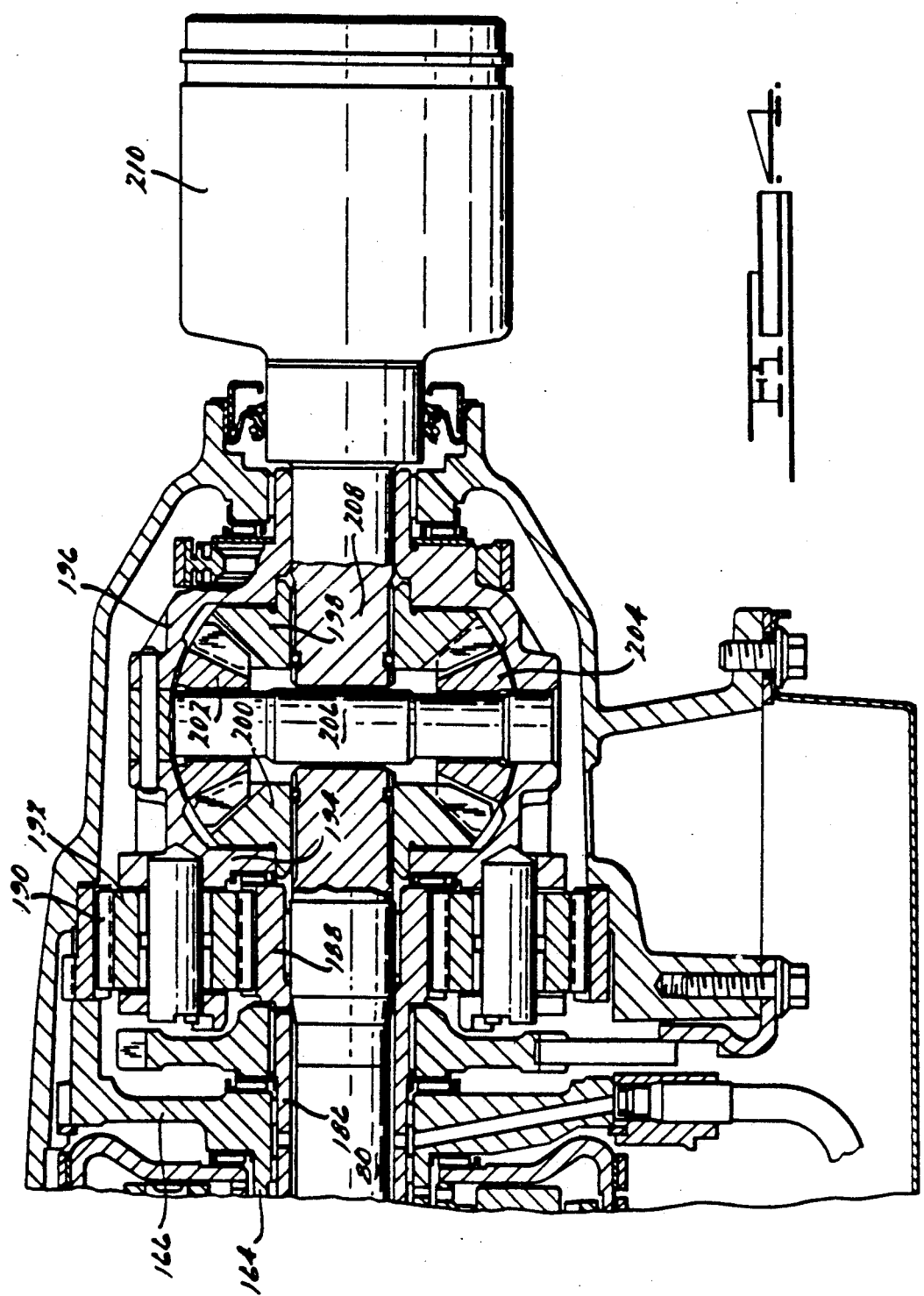
FIG. 4 is a cross-sectional view of a part of the final drive gearing of the transaxle of my invention.

The carrier 172 of gear unit 160 is splined to final drive input sleeve shaft 186, which is connected to final drive sun gear 188. Final drive ring gear 190, as seen in FIG. 4, is secured to the housing portion 14. Planetary pinions 192 engage ring gear 190 and sun gear 188. They are supported by a carrier 194, which forms a part of differential carrier 196.

Differential side gears 198 and 200 are located within the differential carrier 196. They driveably engage differential pinions 202 and 204 journaled on pinion shaft 206. A first output shaft 208 is connected by means of a universal joint 210 to one axle half shaft. Side gear 200 is connected by means of power output shaft 80 to the input side of a second universal joint 212, as seen in FIG. 2. Universal joint 212 provides a driving connection with a second half shaft for one of the traction wheels.

Mode of Operation

Figures 5, 6:
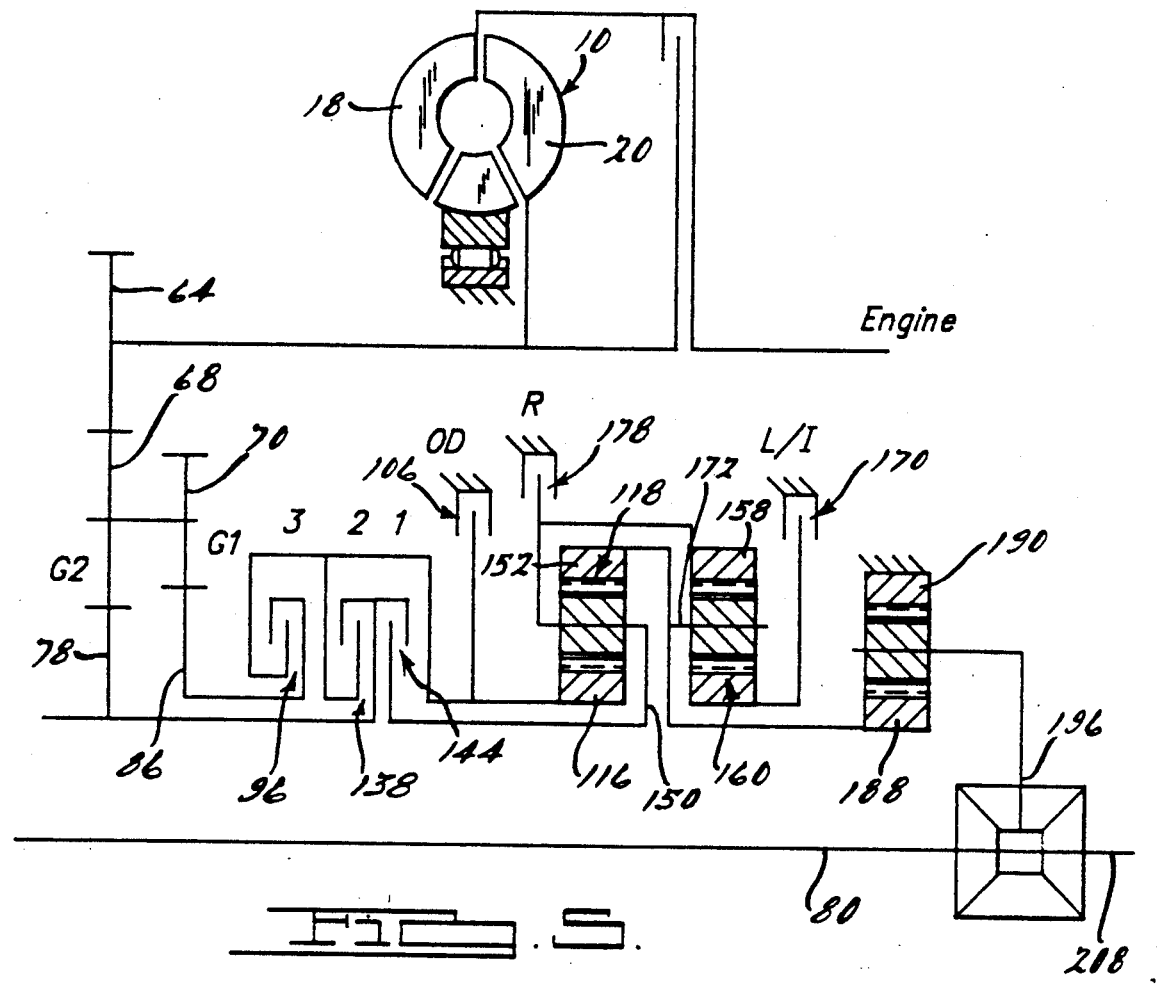
FIG. 5 is a schematic diagram showing the converter and gear elements of the transaxle of FIGS. 1, 2 and 3.
FIG. 6 is a chart that shows the engagement and release pattern for the clutches and brakes illustrated schematically in FIG. 5.

For purposes of explaining the operation of the transaxle, reference will be made to FIGS. 5 and 6. For purposes of correlating the chart of FIG. 6 with the schematic diagram of FIG. 5, the three clutches are identified by the symbols "1", "2", and "3" in FIG. 5. These correspond respectively to clutch assembly 144, clutch assembly 138 and clutch assembly 96. Similar nomenclature is used in the chart of FIG. 5. Also, in FIGS. 5 and 6, reverse brake 178 carries the symbol "R" and the low and intermediate brake assembly 170 carries the symbol "L/I". The driven gear 78 of the transfer drive carries the notation "G2" and the driven gear 86 of the transfer drive carries the notation "G1".

To establish low speed ratio operation, brake assembly L/I and clutch 3 are applied. Turbine torque then is delivered from turbine 20, through gear 64 and idler 70 to gear G1, which has a larger pitch diameter than gear 62. The torque of gear G1 is transferred through engaged clutch 3 to the sun gear 116 of the planetary gear unit 118. A dual torque flow path thus is established in the planetary gearing as torque is transferred from the sun gear and through the carrier for gear unit 118 to the ring gear for gear unit 160 and as torque is transferred from the ring gear of gear unit 118 to the carrier of gear unit 160. The combined torque then is transferred to the torque input sun gear 188 of the final drive gear unit.

A ratio change to the second speed ratio is achieved by disengaging clutch 3 and engaging clutch 2 in synchronism. This, in effect, is a trade of the torque input gears G1 and G2. Since the pitch diameter of gear G2 is smaller than the pitch diameter of gear G1, the ratio of the overall driveline then is higher.

Clutch 2 is released as clutch 1 is applied to effect a ratio change to the third ratio. Thus, since gear 78 remains active in the torque flow path the speed ratio again is increased to torque is delivered from the gear 78 to ring gear 158 of gear unit 160 through the carrier 150 of gear unit 118.

The ratio change to the fourth ratio is achieved by engaging clutch 2 and releasing brake L/I syncrhonously as clutch 1 remains applied. This locks up the elements of the planetary gearing as gear 78 continues to act as the torque input element.

To achieve the highest speed ratio it merely is necessary to trade input elements by releasing the clutch 2 while clutch 1 remains applied and synchronously engaging the overdrive brake 106, which anchors the sun gear 116. Thus, the ring gear for the gear unit 118 is overdriven.

It is seen from the foregoing description that a basic four speed ratio planetary transmission of the kind shown in U.S. Pat. No. 4,509,389 may be used as part of a combination that is capable of achieving five forward driving speed ratios.

Portions of the structure that develops the fifth ratio as well as the fourth ratio are common to those portions of the torque flow paths that develop the other forward driving ratios. Particularly, the clutches and brakes situated between the four speed ratio planetary gear system and the previously described transfer drive perform the function of the structure described in U.S. Pat. No. 4,509,389 for achieving ratio changes from the low speed drive ratio to a higher speed drive ratio. They achieve the additional function without any increase in space.

The dual pitch diameter gearing for the torque transfer drive, like the torque transfer gearing of my copending application, Serial No. 412,232, makes it possible to achieve two counteracting efficiency effects, as explained below, during operation of the vehicle in a so-called city driving mode.

A useful design parameter that is used in calculating appropriate ratio spread for a transaxle so that the transaxle may match the speed-torque characteristics of the engine is the so-called N/V factor. That factor equals engine speed divided by vehicle speed. A relatively high N/V factor, which can be achieved by appropriately selecting the pitch diameters of the torque transfer gears, will result in a decrease in the engine efficiency because of the higher operating speeds and the lower loading. The so-called transaxle efficiency, however, would increase with an increasing N/V factor because the torque converter would assume a locked up condition over a larger portion of the operating cycle. The overall powertrain efficiency, therefore, which is a product of the transaxle efficiency and engine efficiency, may be maintained at a relatively constant value.

Changes in the fuel efficiency of the engine that are brought about by a change in the N/V factor are made at the expense of top gear gradeability if the N/V change is an increase.

Another design consideration is overall fuel economy during highway operation as opposed to city driving operation. In this instance, an increase in the top gear N/V causes a decrease in both engine efficiency and transaxle efficiency due to the higher speed and the lighter load in the engine.

All of these design considerations must be taken into account and an appropriate design compromise must be made. This can be done by appropriately choosing the pitch diameters of the gears of the torque transfer drive. My invention makes it possible to incorporate such design changes without altering the basic design considerations of the transaxle and without altering the space requirements for the torque transfer gearing.

Having described a preferred embodiment of my invention, what I claim and desire to secure by U.S. Letters Patent is:

1. A multiple speed ratio transaxle for an automotive vehicle driveline having an internal combustion engine comprising:
   a hydrokinetic unit having an impeller and a turbine mounted on a first axis, said engine having a crankshaft connected driveably to said impeller;
   a multiple ratio transmission having gear elements mounted on a second axis, clutch and brake means mounted on said second axis for controlling the relative motion of said gear elements whereby plural torque flow paths are established for forward drive and a single torque flow path is established for reverse, a driven member mounted on said second axis; and
   a torque transfer drive means connecting said turbine with torque input elements of said multiple ratio transmission including gear members defining two torque flow paths of different speed ratio;
   said clutch and brake means partly defining and being adapted to establish selectively torque flow paths for said torque transfer drive as well as for said multiple ratio transmission.

2. The combination as set forth in claim 1 wherein said transmission gear elements comprise two simple planetary gear units, each gear unit having a sun gear, a ring gear, a carrier and planet pinions journaled on said carrier in meshing engagement with said sun and ring gear;
   the ring gear of a first of said planetary gear units being connected to the carrier of the second of said planetary gear units, the carrier of said first planetary gear unit being connected to the ring gear of the second of said gear units, a torque output shaft connected to the carrier of said second planetary gear unit;
   said brake means being adapted to brake the carrier of said first planetary gear unit during reverse drive and to brake the sun gear of said second planetary gear unit during operation in the lowest speed ratios;
   said brake means braking the sun gear of said first planetary gear unit during overdrive operation.

3. A transaxle assembly for an automotive vehicle driveline comprising a hydrokinetic torque converter with a turbine and an impeller, said impeller being adapted to be driven by an engine;
   a multiple ratio transmission having gear elements mounted on a torque output shaft axis, said torque converter being mounted on a torque input turbine shaft axis, said torque output shaft axis being parallel to said turbine shaft axis;
   a multiple ratio torque transfer drive means for delivering torque between said axes;
   selectively engageable brake means mounted on said torque output shaft axis for establishing reaction points for said gear elements of said transmission and selectively engageable clutch means for establishing sequentially with said brake means multiple torque flow paths for a multiple ratio forward driving mode and a reverse driving mode;
   said torque transfer drive means having a driving gear connected to said turbine shaft and a driven gear mounted on said torque output shaft axis, said clutch means being mounted on said torque output shaft axis and having torque inpu portions connected to said driven gear whereby said torque transfer drive is effective to increase the number of transaxle assembly ratios beyond the number of ratios that are made available by said multiple ratio transmission.

4. The combination as set forth in claim 3 wherein said transmission gear elements comprise two simple planetary gear units, each gear unit having a sun gear, a ring gear, a carrier and planet pinions journaled on said carrier in meshing engagement with said sun and ring gear;
   the ring gear of a first of said planetary gear units being connected to the carrier of the second of said planetary gear units, the carrier of said first planetary gear unit being connected to the ring gear of the second of said gear units, a torque output shaft connected to the carrier of said second planetary gear unit;
   said brake means being adapted to brake the carrier of said first planetary gear unit during reverse drive and to brake the sun gear of said second planetary gear unit during operation in the lowest speed ratios;
   said brake means braking the sun gear of said first planetary gear unit during overdrive operation.

5. A transaxle assembly for an automotive vehicle driveline comprising a hydrokinetic torque converter with an impeller and a turbine mounted on a first axis;

a planetary transmission having planetary gear elements mounted on a second axis parallel to said first axis;

multiple ratio torque transfer drive means for transferring torque between said axes comprising a driving gear connected to said turbine and two driven gears mounted on said second axis;

brake means mounted on said second axis for separately and selectively braking a first of said planetary gear elements to effect a torque reaction for a first forward drive ratio, a second of said planetary gear elements to effect overdrive and a third of said planetary gear elements to effect reverse drive; and clutch means mounted on said second axis for separately and selectively connecting one of said driven gears to one of said planetary gear elements and the other of said driven gears to another of said gear elements.

6. The combination as set forth in claim 5 wherein said transmission planetary gear elements comprise two simple planetary gear units, each gear unit having a sun gear, a ring gear, a carrier and planet pinions journaled on said carrier in meshing engagement with said sun and ring gear;

the ring gear of a first of said planetary gear units being connected to the carrier of the second of said planetary gar units, the carrier of said first planetary gear unit being connected to the ring gear of the second of said gear units, a torque output shaft connected to the carrier of said second planetary gear unit;

said brake means being adapted to brake the carrier of said first planetary gear unit during reverse drive and to brake the sun gear of said second planetary gear unit during operation in the lowest speed ratios;

said brake means braking the sun gear of said first planetary gear unit during overdrive operation.

7. A transaxle assembly for an automotive vehicle driveline comprising a hydrokinetic torque converter with an impeller and a turbine mounted on a first axis;

a planetary transmission having planetary gear elements mounted on a second axis parallel to said first axis;

multiple ratio torque transfer drive means for transferring torque between said axes comprising a driving gear connected to said turbine and two driven gears mounted on said second axis;

brake means mounted on said second axis for separately and selectively braking a first of said planetary gear elements to effect a torque reaction for a first forward drive ratio, a second of said planetary gear elements to effect overdrive and a third of said planetary gear elements to effect reverse drive; and clutch means mounted on said second axis for separately and selectively connecting one of said driven gears to one of said planetary gears to effect low speed underdrive ratio and the other of said driven gears to another of said planetary gear elements to effect second underdrive ratio.

8. The combination as set forth in claim 7 wherein said transmission planetary gear elements comprise two simple planetary gear units, each gear unit having a sun gear, a ring gear, a carrier and planet pinions journaled on said carrier in meshing engagement with said sun and ring gear;

the ring gear of a first of said planetary gear units being connected to the carrier of the second of said planetary gear units, the carrier of said first planetary gear unit being connected to the ring gear of the second of said gear units, a torque output shaft connected to the carrier of said second planetary gear unit;

said brake means being adapted to brake the carrier of said first planetary gear unit during reverse drive and to brake the sun gear of said second planetary gear unit during operation in the lowest speed ratios;

said brake means braking the sun gear of said first planetary gear unit during overdrive operation.

9. A transaxle assembly for an automotive vehicle driveline comprising a hydrokinetic torque converter with an impeller and a turbine mounted on a first axis;

a planetary transmission having planetary gear elements mounted on a second axis parallel to said first axis;

multiple ratio torque transfer drive means for transferring torque between said axes comprising a driving gear connected to said turbine and two driven gears mounted on said second axis;

brake means mounted on said second axis for separately and selectively braking a first of said planetary gear elements to effect a torque reaction for a first forward drive ratio, a second of said planetary gear elements to effect overdrive and a third of said planetary gear elements to effect reverse drive; and clutch means mounted on said second axis for separately and selectively connecting one of said driven gears to one of said planetary gear elements to effect low speed underdrive ratio and the other of said driven gears to of said one planetary gear elements to effect second underdrive ratio and for separately and selectively connecting the other of said driven gears to another of said planetary gear elements to effect overdrive operation as said second of said planetary gear elements is braked.

10. The combination as set forth in claim 9 wherein said transmission planetary gear elements comprise two simple planetary gear units, each gear unit having a sun gear, a ring gear, a carrier and planet pinions journaled on said carrier in meshing engagement with said sun and ring gear;

the ring gear of a first of said planetary gear units being connected to the carrier of the second of said planetary gear units, the carrier of said first planetary gear unit being connected to the ring gear of the second of said gear units, a torque output shaft connected to the carrier of said second planetary gear unit;

said brake means being adapted to brake the carrier of said first planetary gear unit during reverse drive and to brake the sun gear of said second planetary gear unit during operation in the lowest speed ratios;

said brake means braking the sun gear of said first planetary gear unit during overdrive operation.

11. A transaxle assembly for an automotive vehicle driveline comprising a hydrokinetic torque converter with an impeller and a turbine mounted on a first axis;

a planetary transmission having planetary gear elements mounted on a second axis parallel to said first axis;

multiple ratio torque transfer drive means for transferring torque between said axes comprising a driving gear connected to said turbine and two driven gears mounted on said second axis;

brake means mounted on said second axis for separately and selectively braking a first of said planetary gear elements to effect a torque reaction for a first forward drive ratio, a second of said planetary gear elements to effect overdrive and a third of said planetary gear elements to effect reverse drive; and clutch means mounted on said second axis for separately and selectively connecting one of said driven gears to one of said planetary gear elements to effect low speed underdrive ratio and the other of said driven gears to said one planetary gear element to effect second underdrive ratio and for separately and selectively connecting the other of said driven gears to another of said planetary gear elements to effect overdrive as said second planetary gear unit is braked, said clutch means connecting said first and second planetary gear units together for operation of said planetary gears with a ratio of unity.

12. The combination as set forth in claim 11 wherein said transmission planetary gear elements comprise two simple planetary gear units, each gear unit having a sun gear, a ring gear, a carrier and planet pinions journaled on said carrier in meshing engagement with said sun and ring gear;

the ring gear of a first of said planetary gear units being connected to the carrier of the second of said planetary gear units, the carrier of said first planetary gear unit being connected to the ring gear of the second of said gear units, a torque output shaft connected to the carrier of said second planetary gear unit;

said brake means being adapted to brake the carrier of said first planetary gear unit during reverse drive and to brake the sun gear of said second planetary gear unit during operation in the lowest speed ratios;

said brake means braking the sun gear of said first planetary gear unit during overdrive operation.

* * * * *